US012319148B2

(12) United States Patent
Ikezawa et al.

(10) Patent No.: US 12,319,148 B2
(45) Date of Patent: Jun. 3, 2025

(54) ELECTRIC VEHICLE

(71) Applicant: SUBARU CORPORATION, Tokyo (JP)

(72) Inventors: Naonori Ikezawa, Tokyo (JP); Takahiro Yamamoto, Tokyo (JP); Kiyofumi Sato, Tokyo (JP); Hironao Sato, Tokyo (JP); Kyohei Yamamoto, Tokyo (JP); Hideto Fukuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 65 days.

(21) Appl. No.: 18/241,373

(22) Filed: Sep. 1, 2023

(65) Prior Publication Data

US 2024/0083259 A1 Mar. 14, 2024

(30) Foreign Application Priority Data

Sep. 12, 2022 (JP) .................. 2022-144772

(51) Int. Cl.
*B60L 15/20* (2006.01)
*B60K 26/02* (2006.01)

(52) U.S. Cl.
CPC ......... *B60L 15/20* (2013.01); *B60L 2240/461* (2013.01); *B60L 2250/24* (2013.01); *B60L 2250/26* (2013.01); *B60L 2250/28* (2013.01)

(58) Field of Classification Search
CPC .............. B60L 15/02; B60L 2240/461; B60L 2250/24; B60L 2250/26; B60L 2250/28; B60K 26/02
See application file for complete search history.

(56) References Cited

U.S. PATENT DOCUMENTS

| 2014/0257653 | A1* | 9/2014 | Sato .................. B60W 50/14 701/55 |
| 2021/0229550 | A1 | 7/2021 | Isami |
| 2024/0166057 | A1* | 5/2024 | Isami ................. B60L 15/2054 |
| 2024/0181894 | A1* | 6/2024 | Nishimine ............ B60K 26/02 |

FOREIGN PATENT DOCUMENTS

JP 2021-118569 A 8/2021

* cited by examiner

*Primary Examiner* — Tan Q Nguyen
(74) *Attorney, Agent, or Firm* — TROUTMAN PEPPER LOCKE LLP

(57) ABSTRACT

An electric vehicle including a motor as a driving source includes: an accelerator; a pseudo shifter mimicking a gear changing operation; a pseudo clutch mimicking a clutch operation; a detector detecting an operation mode performed on each of the accelerator, pseudo shifter, and pseudo clutch by a driver, and a rotation speed of a driving wheel; a reaction force generator generating a reaction force in the pseudo shifter in response to a driver operation performed thereon; and a controller determining the reaction force. The controller includes a processor and a memory coupled thereto. The processor calculates a virtual differential rotation speed that is based on a virtual engine rotation speed, mimicking an engine rotation speed when the driving source is assumed as being an engine, and the rotation speed based on a detection result of the detector, and determines the reaction force based on the virtual differential rotation speed.

3 Claims, 12 Drawing Sheets

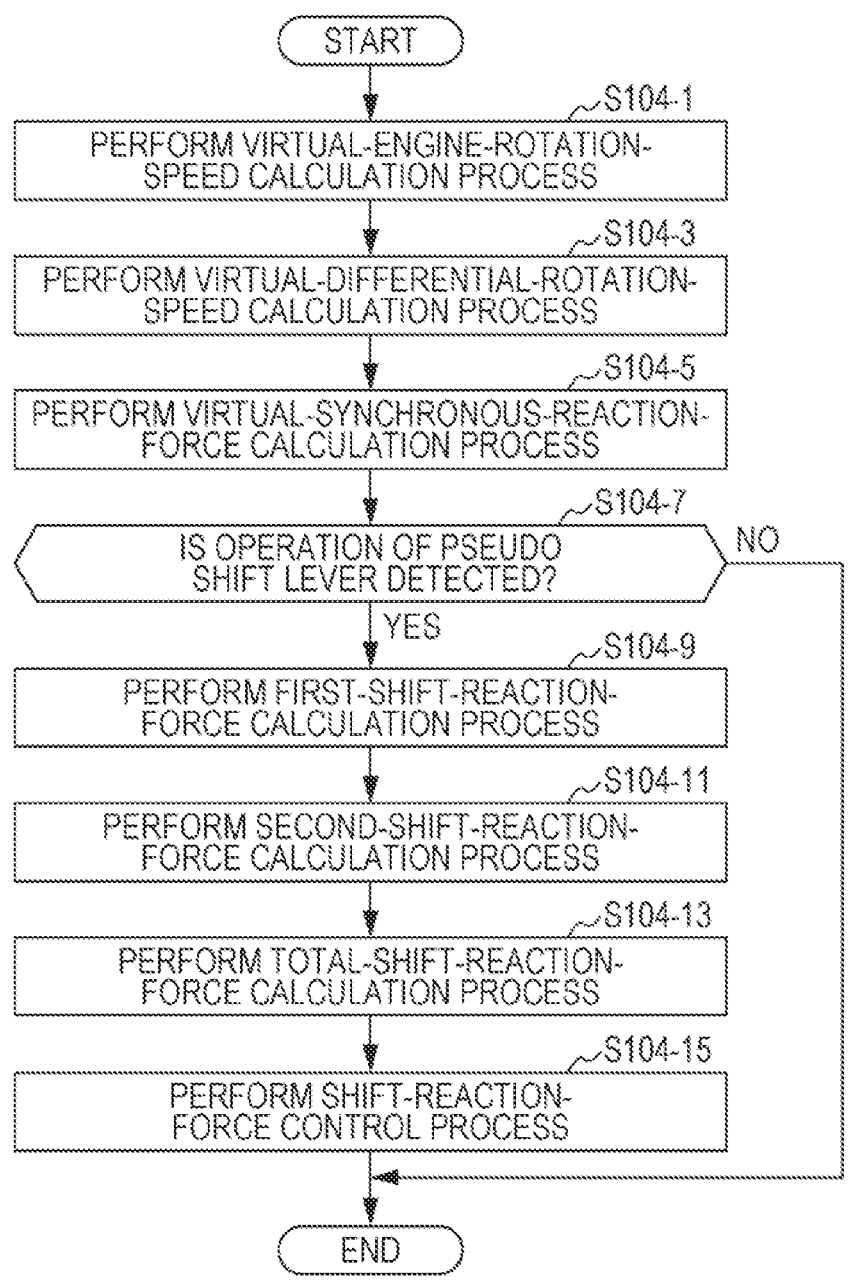

ELECTRIC VEHICLE

CROSS-REFERENCE TO RELATED APPLICATION

The present application claims priority from Japanese Patent Application No. 2022-144772 filed on Sep. 12, 2022, the entire contents of which are hereby incorporated by reference.

BACKGROUND

The disclosure relates to electric vehicles.

Japanese Unexamined Patent Application Publication No. 2021-118569 discloses a technology for reproducing a manual gear changing operation performed by a driver in a so-called manual transmission vehicle (referred to as "MT vehicle" hereinafter), equipped with a gear shifter and a clutch, in a pseudo manner in an electric vehicle driven by a motor.

SUMMARY

An aspect of the disclosure provides an electric vehicle including a motor as a driving source. The electric vehicle includes an accelerator, a pseudo shifter, a pseudo clutch, a detector, a reaction force, and a controller. The accelerator is configured to receive an acceleration request. The pseudo shifter is configured to be operated by a driver who drives the electric vehicle and mimic a gear changing operation. The pseudo clutch is configured to be operated by the driver and mimic a clutch operation. The detector is configured to detect an operation mode performed on the accelerator by the driver, an operation mode performed on the pseudo shifter, an operation mode performed on the pseudo clutch by the driver, and a rotation speed of a driving wheel. The reaction force generator is configured to generate a reaction force in the pseudo shifter in response to the operation performed on the pseudo shifter by the driver. The controller is configured to determine the reaction force to be generated in the pseudo shifter. The controller includes at least one processor and at least one memory coupled to the at least one processor. The at least one processor is configured to calculate a virtual differential rotation speed based on one or more of detection results obtained by the detector. The virtual differential rotation speed is based on at least a virtual engine rotation speed and the rotation speed of the driving wheel, the virtual engine rotation speed mimicking an engine rotation speed when the driving source is assumed as being an engine. The at least one processor is configured to determine the reaction force to be generated in the pseudo shifter based on at least the virtual differential rotation speed.

An aspect of the disclosure provides an electric vehicle including a motor as a driving source. The electric vehicle includes: an accelerator pedal configured to receive an acceleration request; a pseudo shift lever configured to be operated by a driver who drives the electric vehicle and mimic a gear changing operation; a pseudo clutch pedal configured to be operated by the driver and mimic a clutch operation; a reaction force generator including an actuator configured to be driven in response to an operation performed on the pseudo shift lever by the driver, the reaction force generator being configured to generate a reaction force in the pseudo shift lever in response to the operation performed on the pseudo shift lever by the driver; and circuitry. The circuitry is configured to detect an operation mode performed on the accelerator pedal by the driver, an operation mode performed on the pseudo shift lever by the driver, an operation mode performed on the pseudo clutch pedal by the driver, a rotation speed of a driving wheel, determine the reaction force to be generated in the pseudo shift lever. The circuitry configured to calculate a virtual differential rotation speed based on one or more of results of detecting the operation mode performed on the accelerator pedal by the driver, the operation mode performed on the pseudo shift lever by the driver, the operation mode performed on the pseudo clutch pedal by the driver, and the rotation speed of a driving wheel, the virtual differential rotation speed being based on at least a virtual engine rotation speed and the rotation speed of the driving wheel, the virtual engine rotation speed mimicking an engine rotation speed when the driving source is assumed as being an engine, and determine the reaction force to be generated in the pseudo shift lever based on at least the virtual differential rotation speed.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 13 is a flowchart illustrating an example of a shift-reaction-force-related process performed by the controller according to the embodiment.

DETAILED DESCRIPTION

In the technology described above, when a manual gear changing operation of an MT vehicle is to be reproduced in a pseudo manner in an electric vehicle, the reproducibility is insufficient and may possibly give a sense of discomfort to the driver seeking the pleasure of manipulating an MT vehicle.

It is desirable to provide an electric vehicle that enables enhanced reproducibility when a manual gear changing operation of an MT vehicle is to be reproduced in a pseudo manner.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
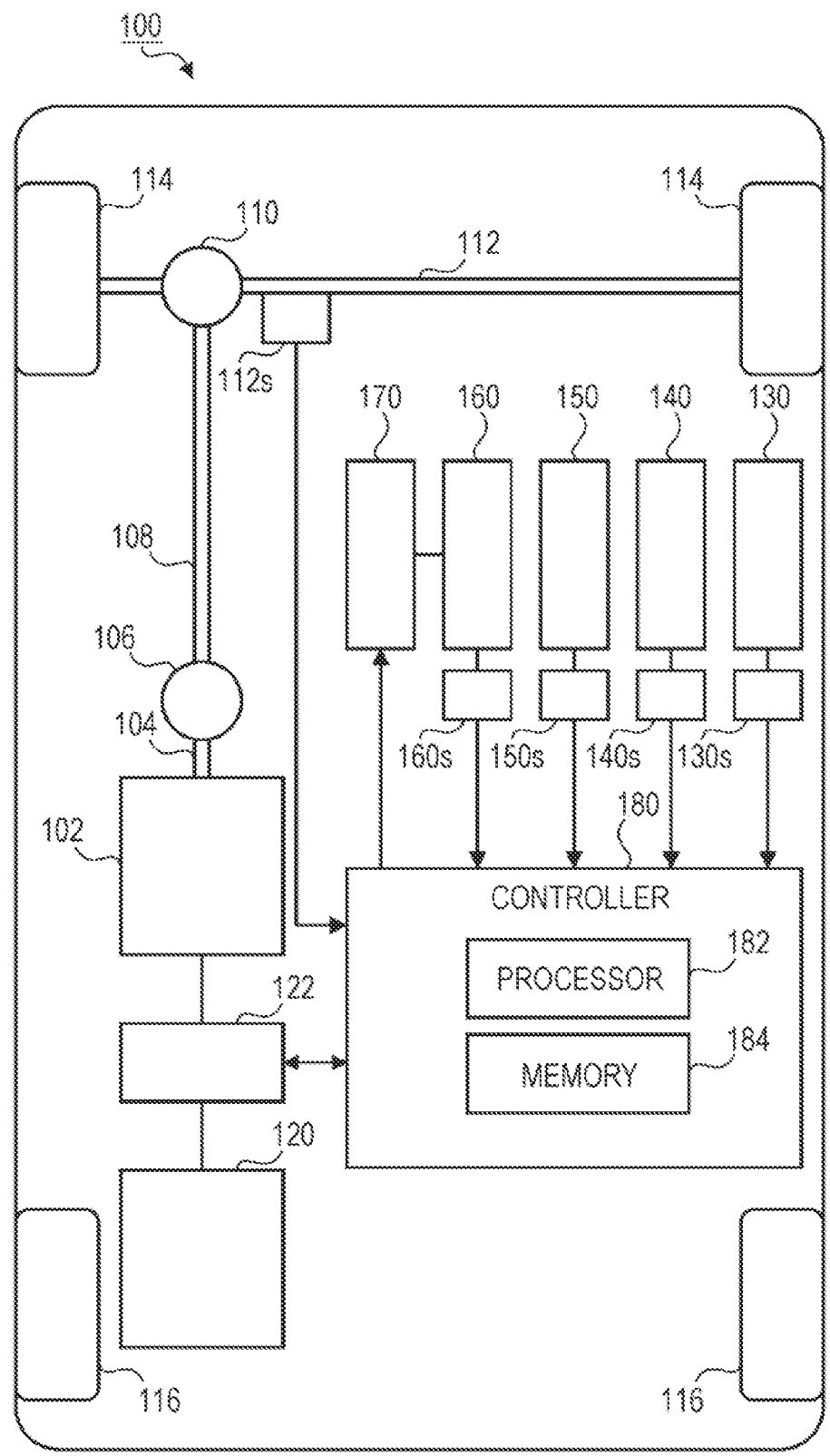
FIG. 1 schematically illustrates the configuration of an electric vehicle according to an embodiment.

FIG. 1 schematically illustrates the configuration of an electric vehicle 100 according to the embodiment. As illustrated in FIG. 1, the electric vehicle 100 includes a motor 102, an output shaft 104, a gear mechanism 106, a propeller shaft 108, a differential gear 110, a drive shaft 112, front wheels 114, and rear wheels 116.

The motor 102 is a driving source in the electric vehicle 100. In one example, the electric vehicle 100 is not equipped with an engine as a driving source, a transmission coupled to the engine, or a clutch mechanism.

The output shaft 104 of the motor 102 is coupled to one end of the propeller shaft 108 with the gear mechanism 106 interposed therebetween. The other end of the propeller shaft 108 is coupled to the drive shaft 112 located toward the front of the electric vehicle 100 with the differential gear 110 interposed therebetween.

The front wheels 114 serving as driving wheels are provided at the front of the electric vehicle 100 and at opposite ends of the drive shaft 112. The rear wheels 116 serving as driven wheels are provided toward the rear of the electric vehicle 100. In the embodiment, although the front wheels 114 are described as being driving wheels and the rear wheels 116 are described as being driven wheels, the configuration is not limited to this. For example, the front wheels 114 and the rear wheels 116 may both serve as driving wheels. The motor 102 may be provided in each wheel to serve as a so-called in-wheel motor.

The electric vehicle 100 includes a battery 120 and an inverter 122. The battery 120 stores electric power to be used for driving the motor 102. The inverter 122 converts direct current stored in the battery 120 into three-phase alternating current. The inverter 122 has a function for controlling driving torque of the motor 102 based on a control command from a controller 180 to be described later.

Furthermore, as illustrated in FIG. 1, the electric vehicle 100 includes an accelerator pedal 130, a brake pedal 140, a pseudo clutch pedal 150, and a pseudo shift lever 160.

The accelerator pedal 130 is to be used by the driver for inputting an acceleration request to the electric vehicle 100. The accelerator pedal 130 is provided with an accelerator pedal sensor 130s for detecting an operational amount (i.e., a pedal pressing amount) by which the accelerator pedal 130 is operated by the driver. A signal detected by the accelerator pedal sensor 130s is output to the controller 180 to be described later.

The brake pedal 140 is to be used by the driver for inputting a brake request to the electric vehicle 100. The brake pedal 140 is provided with a brake pedal sensor 140s for detecting an operational amount (i.e., a pedal pressing amount) by which the brake pedal 140 is operated by the driver. A signal detected by the brake pedal sensor 140s is output to the controller 180 to be described later.

The pseudo clutch pedal 150 and the pseudo shift lever 160 are to be used by the driver for inputting a pseudo gear change request to the electric vehicle 100. However, because the electric vehicle 100 according to the embodiment is driven by the motor 102 and is actually not equipped with an engine as a driving source, the electric vehicle 100 is not equipped with a clutch mechanism and a transmission included in an MT vehicle.

The pseudo clutch pedal 150 has a structure mimicking a clutch pedal included in an MT vehicle. The disposition and the operability of the pseudo clutch pedal 150 are identical to those of an actual MT vehicle. The pseudo clutch pedal 150 is to be stepped on when the driver operates the pseudo shift lever 160.

The pseudo clutch pedal 150 is provided with a pseudo-clutch-pedal sensor 150s for detecting an operational amount (i.e., a pedal pressing amount) by which the pseudo clutch pedal 150 is operated by the driver. A signal detected by the pseudo-clutch-pedal sensor 150s is output to the controller 180 to be described later.

The pseudo shift lever 160 has a structure mimicking a shift lever included in an MT vehicle. The disposition and the operability of the pseudo shift lever 160 are identical to those of an actual MT vehicle.

The pseudo shift lever 160 is to be manually operated when the driver inputs a pseudo gear change request to the electric vehicle 100. The disposition and the operability of the pseudo shift lever 160 are identical to those of an actual MT vehicle.

The pseudo shift lever 160 is provided with a pseudo-shift-lever sensor 160s for detecting the position (i.e., the shift position) of the pseudo shift lever 160 and an operational force applied to the pseudo shift lever 160 by the driver. A signal detected by the pseudo-shift-lever sensor 160s is output to the controller 180 to be described later.

Figure 2:
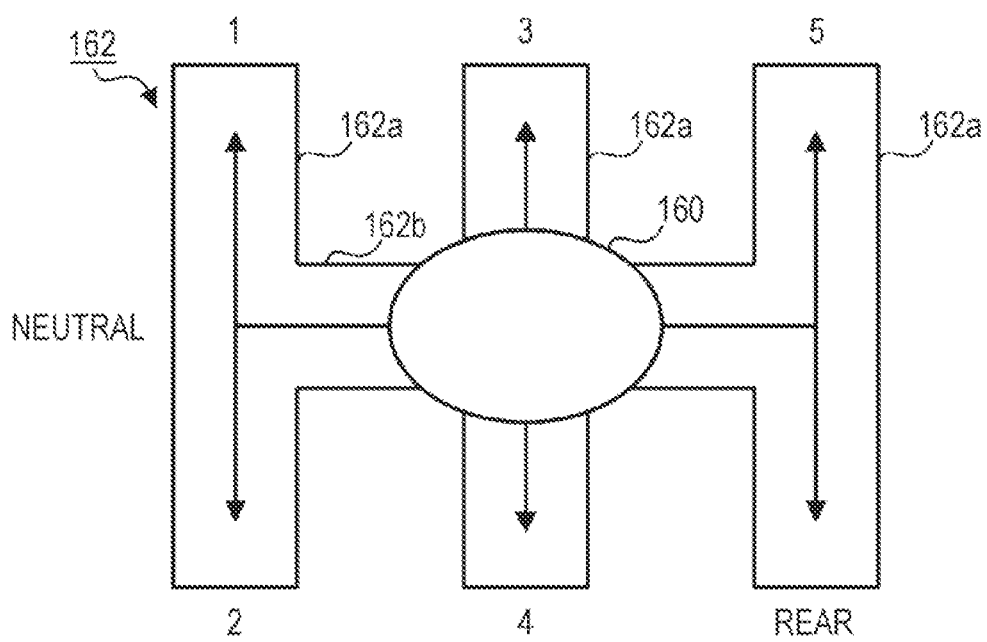
FIG. 2 schematically illustrates an example of a pseudo shift lever according to the embodiment.

FIG. 2 schematically illustrates an example of the pseudo shift lever 160. As illustrated in FIG. 2, the pseudo shift lever 160 to be operated by the driver is inserted in a regulating mechanism 162 for regulating a movable range of the pseudo shift lever 160. The pseudo shift lever 160 is operated by the driver along the regulating mechanism 162.

The regulating mechanism 162 has a so-called H shape having multiple (three in the embodiment) shift channels 162a extending parallel to each other in a shifting direction and a select channel 162b coupled orthogonally to the shift channels 162a and extending in a selecting direction.

The ends of the shift channels 162a are associated with shift patterns corresponding to, for example, the first gear position, second gear position, third gear position, fourth gear position, fifth gear position, and rear position. The entire width of the select channel 162b is associated with the neutral position.

Referring back to FIG. 1, a reaction force generator 170 is capable of generating a reaction force (i.e., a shift reaction force) in the pseudo shift lever 160 when the pseudo shift lever 160 is operated by the driver. The operability of the pseudo shift lever 160 can resemble the operability of the shift lever of an MT vehicle. A detailed structure of the reaction force generator 170 is not particularly limited, and may be, for example, a structure illustrated in FIG. 3 to be described below.

Figure 3:
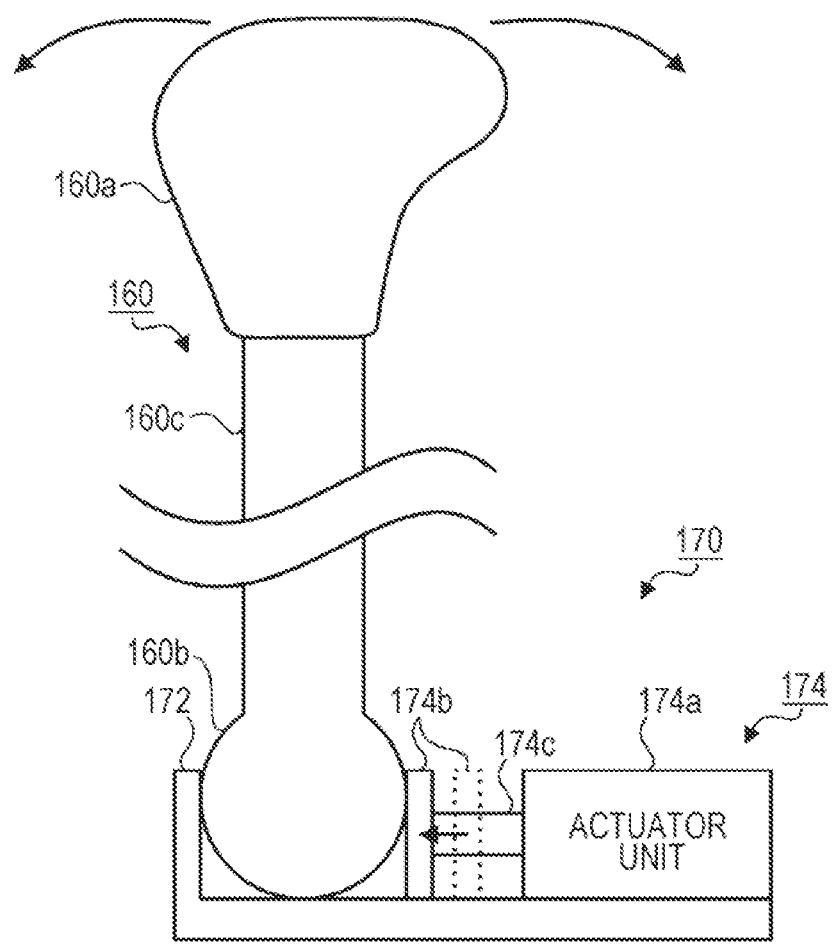
FIG. 3 schematically illustrates an example of a reaction force generator according to the embodiment.

FIG. 3 schematically illustrates an example of the reaction force generator 170 according to the embodiment. As illustrated in FIG. 3, the pseudo shift lever 160 has a pseudo shift knob 160a to be held by the driver. The pseudo shift lever 160 also has a spherical ball 160b acting as the center of rotation of the pseudo shift lever 160 when the pseudo shift lever 160 is operated in the shifting direction and the selecting direction mentioned above. Moreover, the pseudo shift lever 160 has a rod-like coupling 160c that couples the pseudo shift knob 160a and the ball 160b to each other.

As illustrated in FIG. 3, the reaction force generator 170 includes a base member 172 and an actuator 174. As illustrated in FIG. 3, the ball 160b of the pseudo shift lever 160 is in contact with the base member 172 in a rotatable manner.

As illustrated in FIG. 3, the actuator 174 has, an actuator unit 174a, an electric cylinder, a hydraulic cylinder, or a gas cylinder. The actuator 174 has a tabular abutment member 174b capable of pressing against the ball 160b. The actuator 174 also has a rod member 174c that couples the actuator unit 174a and the abutment member 174b to each other.

When the pseudo shift lever 160 is operated by the driver, the actuator 174 is driven in the electric vehicle 100, so that the abutment member 174b presses against the ball 160b. Accordingly, in the electric vehicle 100, a reaction force (i.e., a shift reaction force) can be generated in the pseudo shift lever 160. The actuator 174 is controlled by the controller 180 to be described later.

Referring back to FIG. 1, the controller 180 has at least one processor 182 and at least one memory 184 coupled to the processor 182. The processor 182 includes, for example, a central processing unit (CPU). The memory 184 includes, for example, a read only memory (ROM) and a random access memory (RAM). The ROM is a storage element that stores a program and an arithmetic parameter to be used by the CPU. The RAM is a storage element that temporarily stores data, such as a variable and a parameter, to be used in processing executed by the CPU.

The controller 180 is communicable with various types of sensors (i.e., a rotation speed sensor 112s, the accelerator pedal sensor 130s, the brake pedal sensor 140s, the pseudo-clutch-pedal sensor 150s, and the pseudo-shift-lever sensor 160s) provided in the electric vehicle 100. The controller 180 is also communicable with various types of devices (i.e., the inverter 122 and the reaction force generator 170) provided in the electric vehicle 100. The communication between the controller 180 and the various types of sensors and devices is realized by using, for example, a controller area network (CAN).

Figure 4:
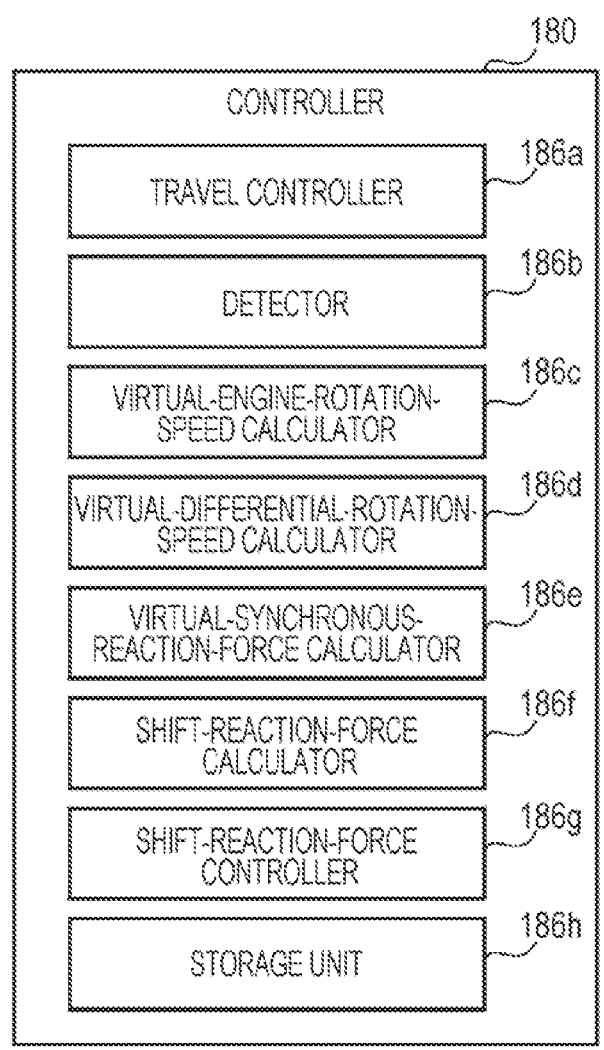
FIG. 4 schematically illustrates the configuration of a controller according to the embodiment.

FIG. 4 schematically illustrates the configuration of the controller 180 according to the embodiment. As illustrated in FIG. 4, the controller 180 includes a travel controller 186a, a detector 186b, a virtual-engine-rotation-speed calculator 186c, a virtual-differential-rotation-speed calculator 186d, a virtual-synchronous-reaction-force calculator 186e, a shift-reaction-force calculator 186f, a shift-reaction-force controller 186g, and a storage unit 186h. In the controller 180, various kinds of processes including the following processes to be performed by the travel controller 186a, the detector 186b, the virtual-engine-rotation-speed calculator 186c, the virtual-differential-rotation-speed calculator 186d, the virtual-synchronous-reaction-force calculator 186e, the shift-reaction-force calculator 186f, and the shift-reaction-force controller 186g are executed by the processor 182. In one example, the processor 182 executes a program stored in the memory 184 so as to execute the various kinds of processes. The function of the storage unit 186h is substantially identical to that of the memory 184.

The various kinds of processes to be performed in the controller 180 may be executed by the processor 182. In one example, the processor 182 executes programs stored in the memory 184 so as to execute the various kinds of processes.

The travel controller 186a executes travel-related control on the electric vehicle 100. In one example, the travel controller 186a receives an operation performed on the accelerator pedal 130 by the driver as an accelerator-pedal operation involving controlling the supply of fuel to an engine in an MT vehicle. Furthermore, the travel controller 186a receives an operation performed on the pseudo clutch pedal 150 by the driver as a shift-lever (shift-device) operation involving changing gear positions in an MT vehicle. Moreover, the travel controller 186a receives an operation performed on the pseudo shift lever 160 by the driver as a clutch-pedal operation involving moving the clutch in an MT vehicle.

The travel controller 186a uses a model mimicking an MT vehicle to calculate a driving-wheel torque determined from the operational amount of the accelerator pedal 130, the operational amount of the pseudo clutch pedal 150, and the shift position of the pseudo shift lever 160.

Then, the travel controller 186a calculates a motor torque for applying the calculated driving-wheel torque to the driving wheels (i.e., the front wheels 114) of the electric vehicle 100. The travel controller 186a then transmits a control command based on the calculated motor torque to the inverter 122. The inverter 122 controls the driving torque of the motor 102 based on the control command received from the travel controller 186a. Accordingly, the electric vehicle 100 realizes torque characteristics mimicking the torque characteristics of an MT vehicle in accordance with the gear position set using the pseudo shift lever 160.

The detector 186b acquires various types of information based on signals input from various sensors in the electric vehicle 100, and stores the various types of information in the storage unit 186h. In one example, the detector 186b acquires an operational amount by which the accelerator pedal 130 is operated by the driver based on a detection signal from the accelerator pedal sensor 130s, and stores the operational amount in the storage unit 186h.

Furthermore, the detector 186b acquires the rotation speed of the drive shaft 112, that is, the rotation speed of the front wheels 114 serving as driving wheels, and the vehicle speed of the electric vehicle 100 based on a detection signal from the rotation speed sensor 112s, and stores the rotation speed and the vehicle speed in the storage unit 186h.

Moreover, the detector 186b acquires the position, that is, the shift position, of the pseudo shift lever 160 based on a detection signal from the pseudo-shift-lever sensor 160s, and stores the position in the storage unit 186h.

Furthermore, the detector 186b acquires an operational force applied to the pseudo shift lever 160 by the driver based on a detection signal from the pseudo-shift-lever sensor 160s, and stores the operational force in the storage unit 186h.

Moreover, the detector 186b acquires an operational amount by which the pseudo clutch pedal 150 is operated by the driver based on a detection signal from the pseudo-clutch-pedal sensor 150s, and stores the operational amount in the storage unit 186h.

The virtual-engine-rotation-speed calculator 186c uses any one of multiple preset virtual-engine-rotation-speed maps to calculate a virtual engine rotation speed mimicking an engine rotation speed of an MT vehicle.

When calculating the virtual engine rotation speed, the virtual-engine-rotation-speed calculator 186c selects any one of the multiple preset virtual-engine-rotation-speed maps. In the embodiment, multiple kinds of virtual-engine-rotation-speed maps are set in accordance with the operational amount by which the pseudo clutch pedal 150 is operated by the driver and the position (i.e., the shift position) of the pseudo shift lever 160 operated by the driver. In the embodiment, the virtual-engine-rotation-speed maps are provided respectively for all combinations of multiple stages, from a state where the pseudo clutch pedal 150 is not operated to a state where the operational amount of the pseudo clutch pedal 150 reaches a maximum value, and multiple shift positions.

Therefore, when calculating the virtual engine rotation speed, the virtual-engine-rotation-speed calculator 186c selects any one of the multiple virtual-engine-rotation-speed maps based on the operational amount of the pseudo clutch pedal 150 detected by the detector 186b and the position (i.e., the shift position) of the pseudo shift lever 160.

Figure 5:
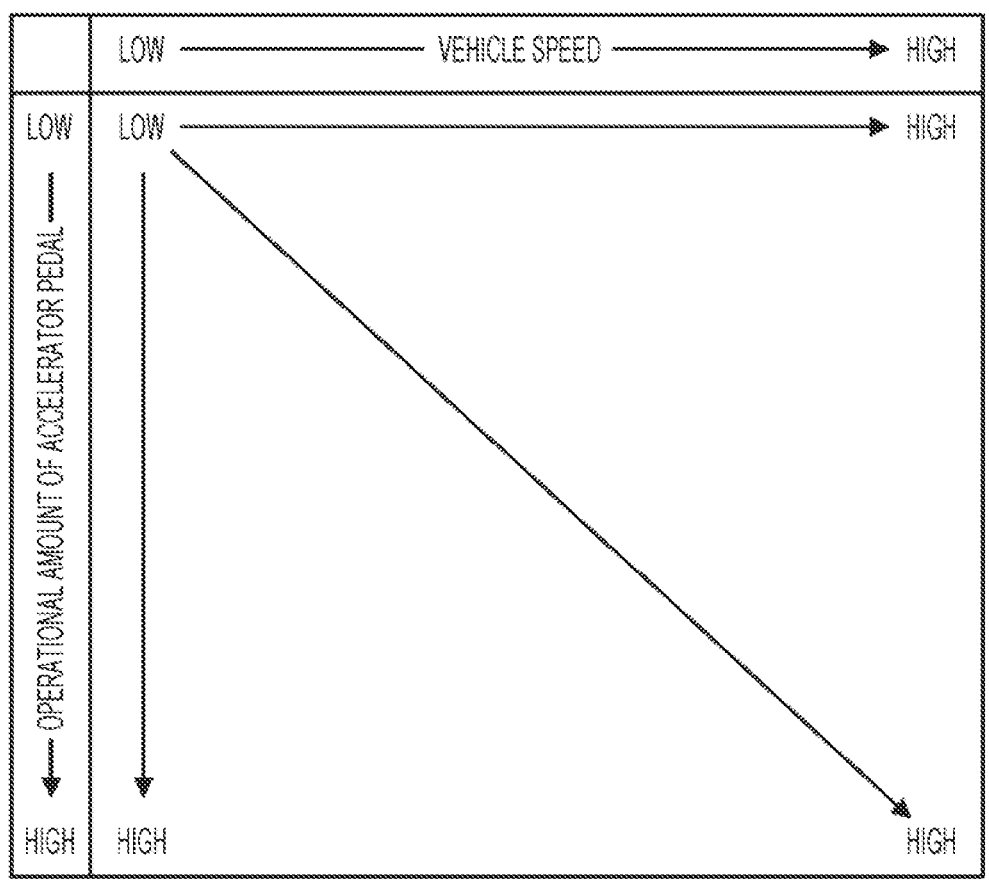
FIG. 5 schematically illustrates an example of a virtual-engine-rotation-speed map according to the embodiment.

FIG. 5 schematically illustrates an example of a virtual-engine-rotation-speed map according to the embodiment. The virtual-engine-rotation-speed map illustrated in FIG. 5 corresponds to a case where the pseudo clutch pedal 150 is not operated by the driver and the shift position is set to the first gear position. As illustrated in FIG. 5, in the virtual-engine-rotation-speed map, the relationship with respect to values of the virtual engine rotation speed mimicking the engine rotation speed of an MT vehicle is defined when the abscissa axis denotes the vehicle speed of the electric vehicle 100 and the ordinate axis denotes the operational amount by which the accelerator pedal 130 is operated by the driver. As illustrated in FIG. 5, the relationship defined in the virtual-engine-rotation-speed map indicates that the value of the virtual engine rotation speed tends to increase with increasing vehicle speed value and increasing operational amount of the accelerator pedal 130.

The virtual-engine-rotation-speed calculator 186c refers to the selected virtual-engine-rotation-speed map to calculate a virtual engine rotation speed based on the vehicle speed of the electric vehicle 100 and the operational amount of the accelerator pedal 130, and stores the calculated virtual engine rotation speed in the storage unit 186h.

Figure 6:
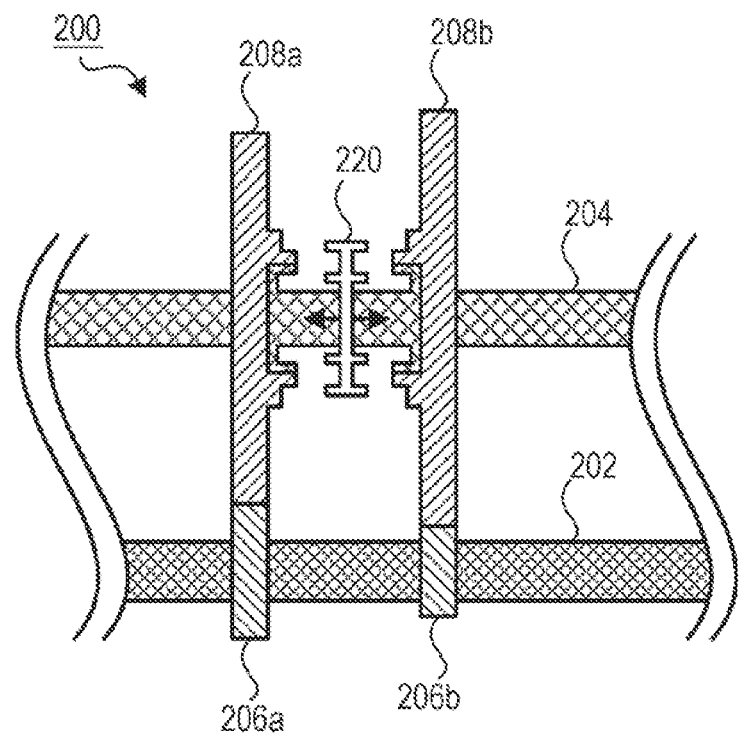
FIG. 6 is a schematic diagram for explaining a virtual differential rotation speed according to the embodiment.

FIG. 6 is a schematic diagram for explaining a virtual differential rotation speed according to the embodiment. FIG. 6 illustrates a part of a virtual transmission 200 that is actually not equipped in the electric vehicle 100. In the virtual transmission 200, a virtual input shaft 202 and a virtual output shaft 204 are disposed parallel to each other. The virtual input shaft 202 is coupled to the virtual output shaft 204 of a virtual engine with a virtual clutch mechanism (not illustrated) interposed therebetween. It is assumed that the virtual output shaft 204 is coupled to the drive shaft 112 with, for example, the differential gear 110 interposed therebetween.

The virtual input shaft 202 includes virtual drive gears 206a and 206b fixed to the virtual input shaft 202. The virtual output shaft 204 includes virtual driven gears 208a and 208b provided in a relatively rotatable manner on the virtual output shaft 204. The virtual drive gear 206a and the virtual driven gear 208a are constantly meshed with each other, and the virtual drive gear 206b and the virtual driven gear 208b are constantly meshed with each other.

The virtual transmission 200 is provided with a virtual synchronizer mechanism 220. The virtual synchronizer mechanism 220 is disposed on the virtual output shaft 204 between the virtual driven gear 208a and the virtual driven gear 208b. The virtual synchronizer mechanism 220 moves along the rotation axis of the virtual output shaft 204 based on an operation performed on the pseudo shift lever 160 by the driver.

Although not illustrated in detail, when the virtual synchronizer mechanism 220 is located in-between the virtual driven gear 208a and the virtual driven gear 208b, as illustrated in FIG. 6, the virtual driven gear 208a and the virtual output shaft 204 are in a separated state where they rotate relatively to each other, and the virtual driven gear 208b and the virtual output shaft 204 are in a separated state where they rotate relatively to each other.

When the virtual synchronizer mechanism 220 moves toward the virtual driven gear 208a based on an operation performed on the pseudo shift lever 160 by the driver, the virtual driven gear 208a transitions to a power transmissible state where it rotates together with the virtual output shaft 204. In this case, the virtual driven gear 208b and the virtual output shaft 204 are in the separated state where they rotate relatively to each other.

When the virtual synchronizer mechanism 220 moves toward the virtual driven gear 208b based on an operation performed on the pseudo shift lever 160 by the driver, the virtual driven gear 208b transitions to a power transmissible state where it rotates together with the virtual output shaft 204. In this case, the virtual driven gear 208a and the virtual output shaft 204 are in the separated state where they rotate relatively to each other.

When the virtual driven gear 208a or the virtual driven gear 208b transitions from the separated state to the power transmissible state in the above-described manner, if there is a difference (i.e., virtual differential rotation) in the rotation speed between the virtual driven gear 208a or 208b and the virtual output shaft 204, a frictional force generated as a result of the virtual synchronizer mechanism 220 sliding with the virtual driven gear 208a or 208b causes a reaction force (i.e., a virtual synchronous reaction force) to occur.

In the embodiment, when the driver operates the pseudo shift lever 160, a reaction force (i.e., a shift reaction force) reflecting the aforementioned virtual synchronous reaction force is generated in the pseudo shift lever 160. Accordingly, this enables enhanced reproducibility when a manual gear changing operation consistent with the sense of the driver seeking the pleasure of manipulating an MT vehicle is to be reproduced in a pseudo manner.

Referring back to FIG. 4, the virtual-differential-rotation-speed calculator 186d calculates a virtual differential rotation speed based on the virtual engine rotation speed calculated by the virtual-engine-rotation-speed calculator 186c and the rotation speed of the front wheels 114, serving as driving wheels, detected by the detector 186b.

In one example, the virtual-differential-rotation-speed calculator 186d calculates a rotation speed of the virtual input shaft 202 in accordance with the virtual engine rotation speed, the operational amount by which the pseudo clutch pedal 150 is operated by the driver, and the position (i.e., the shift position) of the pseudo shift lever 160 operated by the driver.

Then, the virtual-differential-rotation-speed calculator 186d calculates a rotation speed of any of the virtual driven gears corresponding to the shift position from a gear ratio according to the gear position based on the calculated rotation speed of the virtual input shaft 202 and the shift position. For example, if the shift position is the first gear position, the virtual-differential-rotation-speed calculator 186*d* calculates the rotation speed of any of the virtual driven gears corresponding to the first gear position.

If the virtual clutch mechanism is disengaged, the rotation speed of the virtual driven gear 208*a* or 208*b* may be calculated based on the rotation speed of the virtual driven gear 208*a* or 208*b* prior to the disengagement of the virtual clutch mechanism and the time elapsed from the disengagement of the virtual clutch mechanism.

Furthermore, the virtual-differential-rotation-speed calculator 186*d* calculates a rotation speed of the virtual output shaft 204 based on the rotation speed of the drive shaft 112 and the vehicle speed detected by the detector 186*b*.

Then, the virtual-differential-rotation-speed calculator 186*d* calculates a difference (i.e., a virtual differential rotation speed) between the calculated rotation speed of the virtual driven gear 208*a* or 208*b* and the rotation speed of the virtual output shaft 204, and stores the calculated virtual differential rotation speed in the storage unit 186*h*.

As an alternative to the embodiment in which the difference between the rotation speed of the virtual driven gear 208*a* or 208*b* and the rotation speed of the virtual output shaft 204 is calculated for calculating the virtual differential rotation speed, a difference between an indicator indicating the rotation speed of the virtual driven gear 208*a* or 208*b* and an indicator indicating the rotation speed of the virtual output shaft 204 may be calculated as the virtual differential rotation speed.

Figure 7:
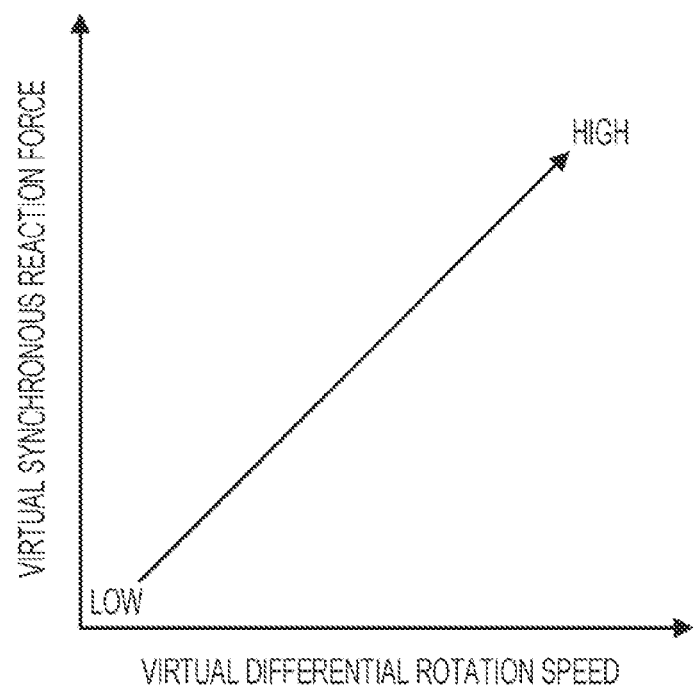
FIG. 7 schematically illustrates an example of a virtual-synchronous-reaction-force map according to the embodiment.

Referring back to FIG. 4, the virtual-synchronous-reaction-force calculator 186*e* calculates a virtual synchronous reaction force based on the virtual differential rotation speed calculated by the virtual-differential-rotation-speed calculator 186*d*. FIG. 7 schematically illustrates an example of a virtual-synchronous-reaction-force map according to the embodiment. As illustrated in FIG. 7, in the virtual-synchronous-reaction-force map, the relationship between a virtual differential rotation speed and a virtual synchronous reaction force mimicking an MT vehicle is defined when the abscissa axis denotes the virtual differential rotation speed calculated by the virtual-differential-rotation-speed calculator 186*d* and the ordinate axis denotes the virtual synchronous reaction force. As illustrated in FIG. 7, in the virtual-synchronous-reaction-force map, the value of the virtual synchronous reaction force increases with increasing value of the virtual differential rotation speed.

The virtual-synchronous-reaction-force calculator 186*e* refers to the virtual-synchronous-reaction-force map illustrated in FIG. 7 to calculate a virtual synchronous reaction force based on the virtual differential rotation speed calculated by the virtual-differential-rotation-speed calculator 186*d*, and stores the calculated virtual synchronous reaction force in the storage unit 186*h*.

Figure 8:
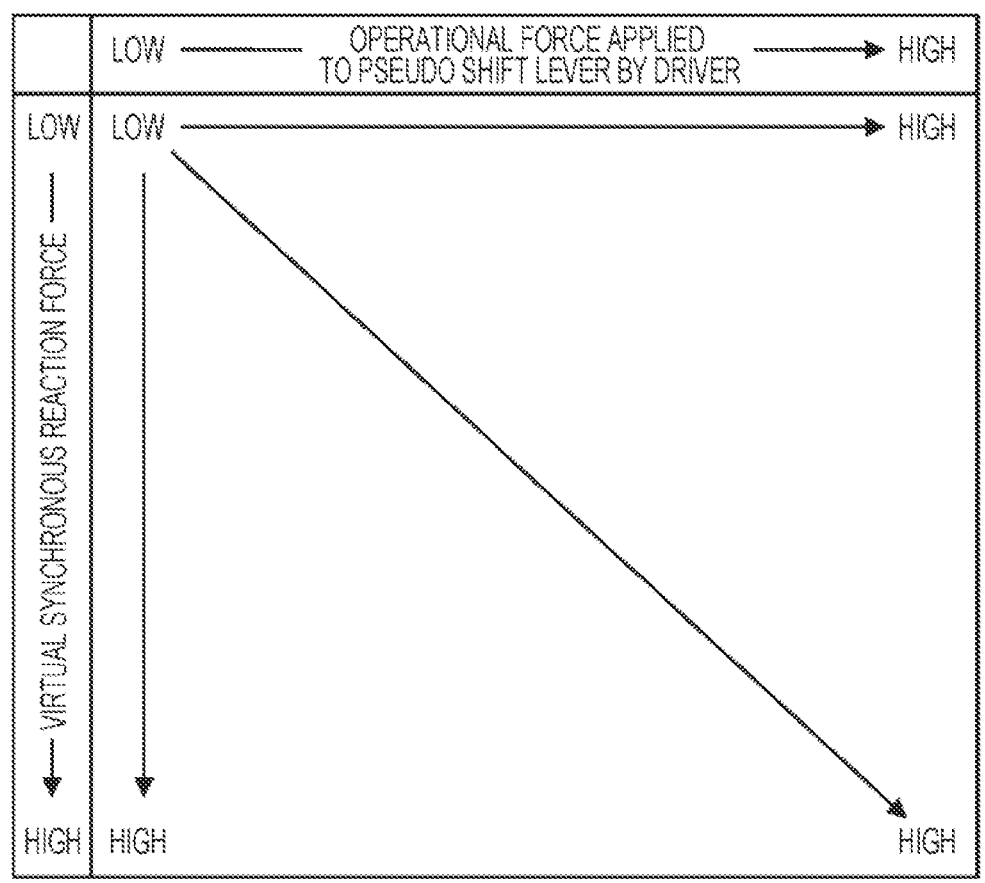
FIG. 8 schematically illustrates an example of a first-shift-reaction-force map according to the embodiment.

Referring back to FIG. 4, the shift-reaction-force calculator 186*f* calculates a first shift reaction force based on the virtual synchronous reaction force calculated by the virtual-synchronous-reaction-force calculator 186*e*. FIG. 8 schematically illustrates an example of a first-shift-reaction-force map according to the embodiment. As illustrated in FIG. 8, in the first-shift-reaction-force map, the relationship with respect to values of the first shift reaction force is defined when the ordinate axis denotes the virtual synchronous reaction force calculated by the virtual-synchronous-reaction-force calculator 186*e* and the abscissa axis denotes the operational force applied to the pseudo shift lever 160 by the driver and detected by the detector 186*b*. As illustrated in FIG. 8, the relationship defined in the first-shift-reaction-force map indicates that the value of the first synchronous reaction force tends to increase with increasing value of the virtual synchronous reaction force and increasing operational force applied to the pseudo shift lever 160 by the driver.

The shift-reaction-force calculator 186*f* refers to the first-shift-reaction-force map illustrated in FIG. 8 to calculate a first shift reaction force based on the virtual synchronous reaction force and the operational force applied to the pseudo shift lever 160 by the driver, and stores the calculated first shift reaction force in the storage unit 186*h*.

Figure 9:
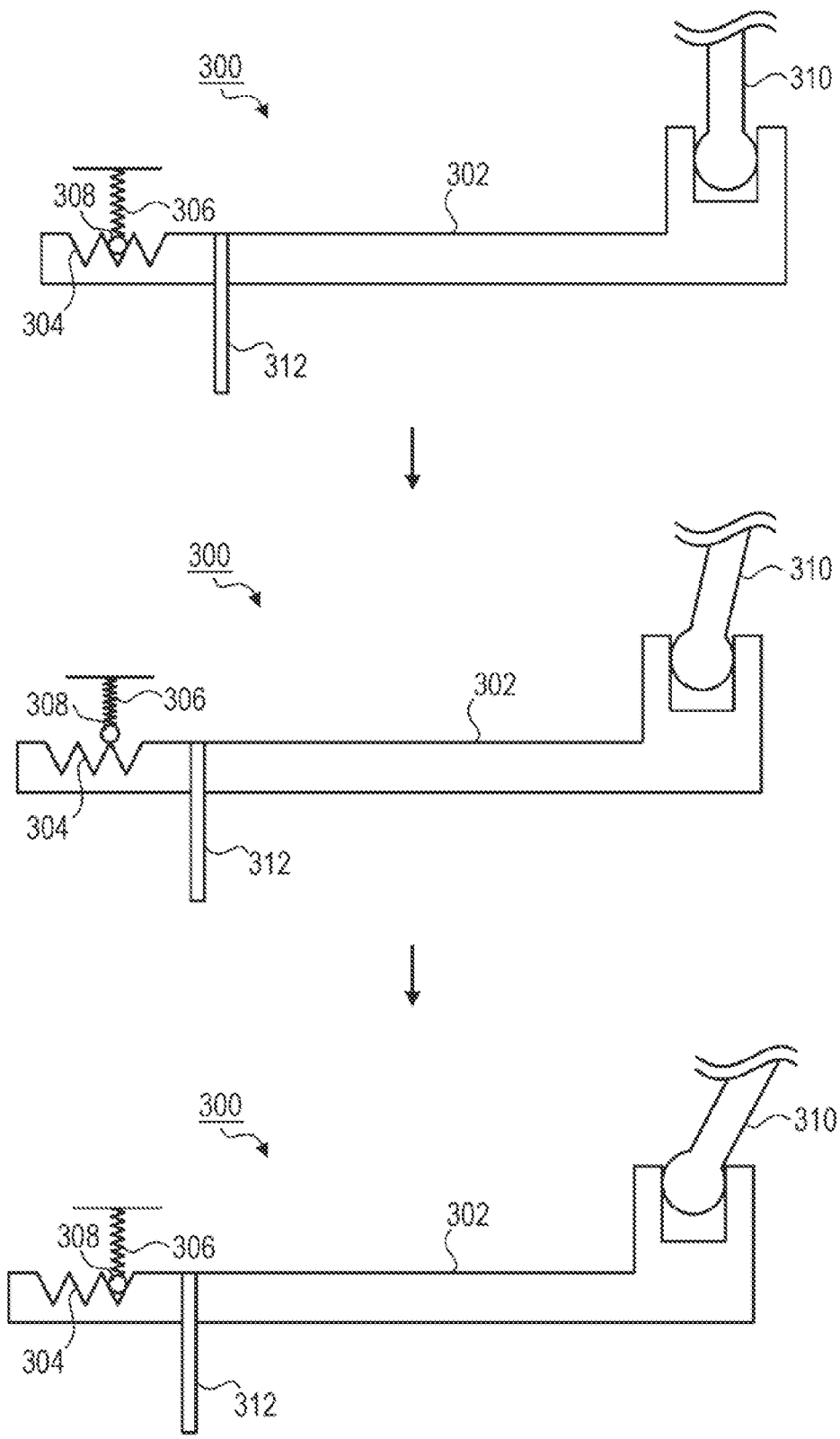
FIG. 9 is a schematic diagram for explaining a second shift reaction force according to the embodiment.

FIG. 9 is a schematic diagram for explaining a second shift reaction force according to the embodiment. FIG. 9 illustrates a part of a virtual shift selector 300 that is actually not equipped in the electric vehicle 100. As illustrated in FIG. 9, a virtual fork shaft 302 of the virtual shift selector 300 has virtual detent grooves 304. A virtual detent ball 308 is attached to an area corresponding to the virtual detent grooves 304 in a virtual casing that accommodates the virtual shift selector 300. The virtual detent ball 308 is attached to the aforementioned area with a virtual spring 306 interposed therebetween.

A virtual inner lever 310 is disposed in a rotatable manner around a predetermined axis in accordance with an operation performed on the pseudo shift lever 160. When the virtual inner lever 310 rotates around the predetermined axis in accordance with an operation performed on the pseudo shift lever 160 by the driver, the virtual fork shaft 302 moves in the longitudinal direction, as illustrated in FIG. 9. A virtual shift fork 312 is attached to the virtual fork shaft 302. The virtual shift fork 312 is fitted in a groove (not illustrated) provided in the virtual synchronizer mechanism 220 (see FIG. 6). In one example, the virtual fork shaft 302 moves in the longitudinal direction so that a gear changing operation is performed via the virtual shift fork 312 and the virtual synchronizer mechanism 220.

In one example, as illustrated in FIG. 9, when the virtual fork shaft 302 moves leftward in FIG. 9, the virtual detent ball 308 engages with the right virtual detent groove 304 in FIG. 9.

In this case, the virtual detent ball 308 engages with any one of the virtual detent grooves 304 in accordance with a biasing force of the virtual spring 306, so that the virtual fork shaft 302 is positioned in the longitudinal direction.

In one example, the virtual detent ball 308 is fitted in any one of the virtual detent grooves 304 in accordance with the biasing force of the virtual spring 306. Consequently, in an actual MT vehicle, so-called gear disengagement can be prevented. Furthermore, when changing gear positions, the biasing force of the virtual spring 306 causes a reaction force (i.e., a second shift reaction force) to occur as a result of the virtual detent ball 308 being pressed against a slope of the virtual detent groove 304.

In the embodiment, when the driver operates the pseudo shift lever 160, a reaction force (i.e., a shift reaction force) reflecting the aforementioned second shift reaction force is generated in the pseudo shift lever 160. Accordingly, this enables enhanced reproducibility when a manual gear changing operation consistent with the sense of the driver seeking the pleasure of manipulating an MT vehicle is to be reproduced in a pseudo manner.

Figure 10:
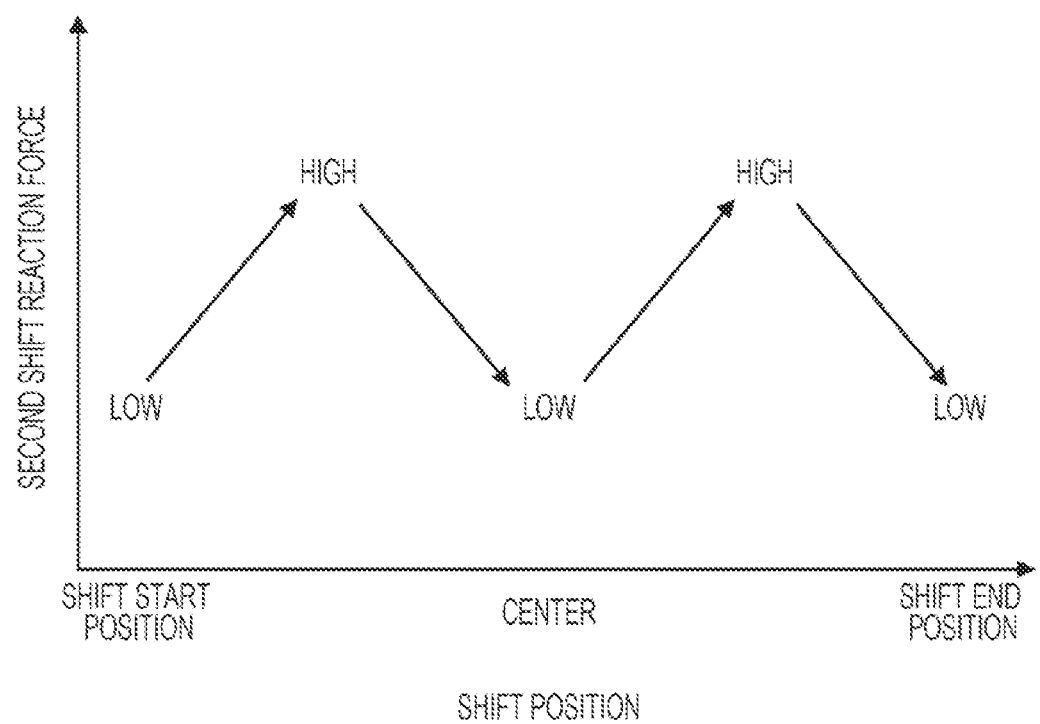
FIG. 10 schematically illustrates an example of a second-shift-reaction-force map according to the embodiment.

Referring back to FIG. 4, the shift-reaction-force calculator 186*f* calculates a second shift reaction force based on the position (i.e., the shift position) of the pseudo shift lever 160 detected by the detector 186*b*. FIG. 10 schematically illustrates an example of a second-shift-reaction-force map according to the embodiment. As illustrated in FIG. 10, in the second-shift-reaction-force map, the relationship between the position (i.e., the shift position) of the pseudo shift lever 160 detected by the detector 186*b* and the second shift reaction force is defined when the abscissa axis denotes the position and the ordinate axis denotes the second shift reaction force.

As illustrated in FIG. 10, in the second-shift-reaction-force map, when the shift position changes from a shift start position, that is, an end of any shift channel 162*a* in FIG. 2, to the center, that is, the select channel 162*b* in FIG. 2, the second shift reaction force tends to transition in a hill-shaped manner such that the value thereof increases and then decreases.

Furthermore, as illustrated in FIG. 10, in the second-shift-reaction-force map, when the shift position changes from the center, that is, the select channel 162*b* in FIG. 2, to a shift end position, that is, an end of any shift channel 162*a* in FIG. 2, the second shift reaction force tends to transition in a hill-shaped manner such that the value thereof increases and then decreases. In one example, when the virtual detent ball 308 is located at an apex between two adjacent virtual detent grooves 304, the value of the second shift reaction force reaches a maximum.

The shift-reaction-force calculator 186*f* refers to the second-shift-reaction-force map to calculate a second shift reaction force based on the position (i.e., the shift position) of the pseudo shift lever 160, and stores the calculated second shift reaction force in the storage unit 186*h*.

The shift-reaction-force calculator 186*f* calculates a value of a total shift reaction force based on the value of the first shift reaction force and the value of the second shift reaction force calculated in the above-described manner, and stores the calculated value of the total shift reaction force in the storage unit 186*h*. In one example, the shift-reaction-force calculator 186*f* calculates the value of the total shift reaction force by adding the value of the first shift reaction force and the value of the second shift reaction force together. Alternatively, the shift-reaction-force calculator 186*f* may calculate the value of the total shift reaction force by multiplying one or more of the value of the first shift reaction force and the value of the second shift reaction force by a predetermined weighting coefficient set in advance.

The shift-reaction-force controller 186*g* causes a shift reaction force device to generate a shift reaction force based on the value of the total shift reaction force calculated by the shift-reaction-force calculator 186*f* in the above-described manner. The flow of processing performed by the controller 180 according to the embodiment will be described below.

Figure 11:
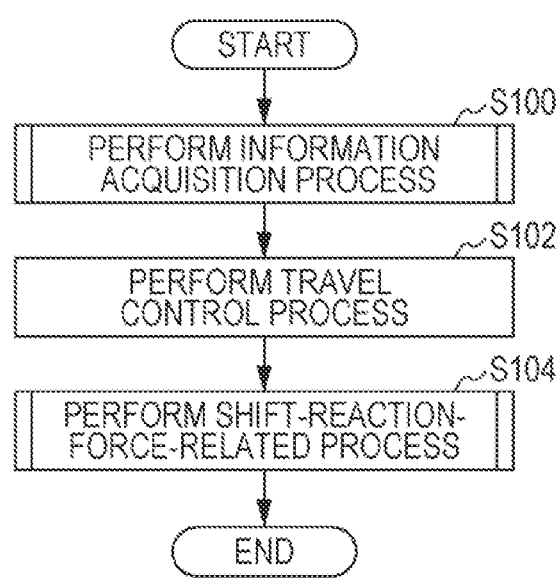
FIG. 11 is a flowchart illustrating an example of interrupt processing performed by the controller according to the embodiment.

FIG. 11 is a flowchart illustrating an example of interrupt processing performed by the controller 180 according to the embodiment. The controller 180 repeats a series of interrupt processing illustrated in FIG. 11 every time an interrupt timing is reached in a predetermined control cycle.

When the aforementioned interrupt timing is reached, the detector 186*b* of the controller 180 of the electric vehicle 100 executes an information acquisition process in step S100 for acquiring information from each type of sensor. The information acquisition process in step S100 will be described in detail later.

The travel controller 186*a* of the controller 180 of the electric vehicle 100 executes a travel control process in step S102 for executing travel-related control on the electric vehicle 100 based on the various types of information acquired in the information acquisition process in step S100. In one example, the travel controller 186*a* uses a model mimicking an MT vehicle to calculate a driving-wheel torque determined from an operational amount of the accelerator pedal 130, an operational amount of the pseudo clutch pedal 150, and the shift position of the pseudo shift lever 160. Then, the travel controller 186*a* calculates a motor torque for applying the calculated driving-wheel torque to the driving wheels (i.e., the front wheels 114) of the electric vehicle 100. The travel controller 186*a* then transmits a control command based on the calculated motor torque to the inverter 122.

Based on the various types of information acquired in the information acquisition process in step S100, the controller 180 of the electric vehicle 100 executes a shift-reaction-force-related process in step S104 for generating a reaction force in response to an operation performed on the pseudo shift lever 160 by the driver. The shift-reaction-force-related process in step S104 will be described in detail later.

Figure 12:
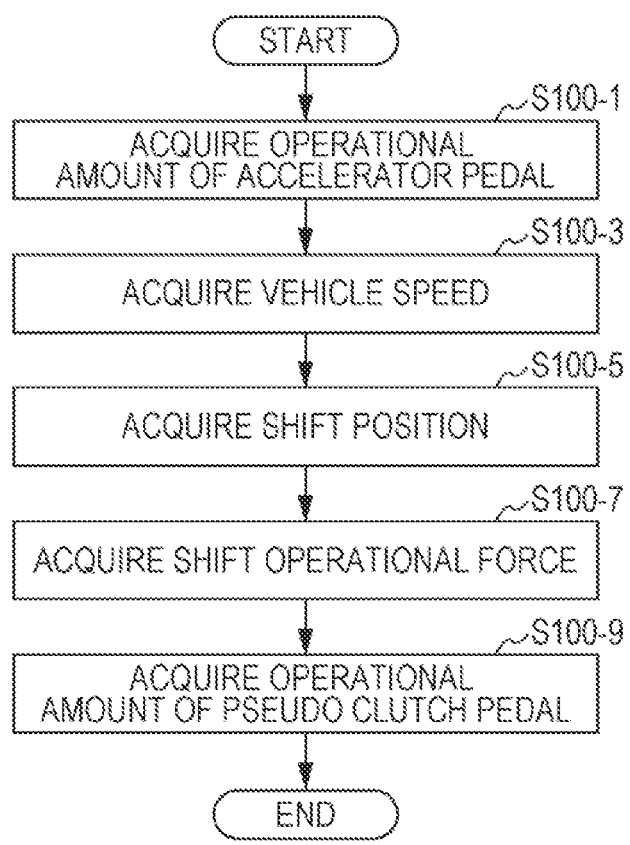
FIG. 12 is a flowchart illustrating an example of an information acquisition process performed by the controller according to the embodiment.

FIG. 12 is a flowchart illustrating an example of the information acquisition process performed in step S100 by the controller 180 according to the embodiment. In step S100-1, the detector 186*b* of the controller 180 of the electric vehicle 100 acquires an operational amount by which the accelerator pedal 130 is operated by the driver based on a detection signal from the accelerator pedal sensor 130*s*, and stores the operational amount in the storage unit 186*h*.

In step S100-3, the detector 186*b* of the controller 180 of the electric vehicle 100 acquires the rotation speed of the drive shaft 112 and the vehicle speed of the electric vehicle 100 based on a detection signal from the rotation speed sensor 112*s*. Moreover, the detector 186*b* of the controller 180 of the electric vehicle 100 stores the acquired rotation speed of the drive shaft 112 and the acquired vehicle speed of the electric vehicle 100 in the storage unit 186*h*.

In step S100-5, the detector 186*b* of the controller 180 of the electric vehicle 100 acquires the position, that is, the shift position, of the pseudo shift lever 160 based on a detection signal from the pseudo-shift-lever sensor 160*s*. Moreover, in step S100-5, the detector 186*b* of the controller 180 of the electric vehicle 100 stores the acquired shift position in the storage unit 186*h*.

In step S100-7, the detector 186*b* of the controller 180 of the electric vehicle 100 acquires an operational force applied to the pseudo shift lever 160 by the driver based on a detection signal from the pseudo-shift-lever sensor 160*s*. Moreover, in step S100-7, the detector 186*b* of the controller 180 of the electric vehicle 100 stores the acquired operational force applied to the pseudo shift lever 160 by the driver in the storage unit 186*h*.

In step S100-9, the detector 186*b* of the controller 180 of the electric vehicle 100 acquires an operational amount by which the pseudo clutch pedal 150 is operated by the driver based on a detection signal from the pseudo-clutch-pedal sensor 150*s*. Moreover, the detector 186*b* of the controller 180 of the electric vehicle 100 stores the acquired operational amount by which the pseudo clutch pedal 150 is operated by the driver in the storage unit 186*h*, and ends the aforementioned information acquisition process.

FIG. 13 is a flowchart illustrating an example of the shift-reaction-force-related process performed in step S104 by the controller 180 according to the embodiment. In step S104-1, the virtual-engine-rotation-speed calculator 186*c* of the controller 180 of the electric vehicle 100 executes a virtual-engine-rotation-speed calculation process for calculating a virtual engine rotation speed. The virtual-engine-rotation-speed calculator 186*c* of the controller 180 of the electric vehicle 100 stores the calculated virtual engine rotation speed in the storage unit 186*h*.

In step S104-3, the virtual-differential-rotation-speed calculator 186*d* of the controller 180 of the electric vehicle 100 executes a virtual-differential-rotation-speed calculation process for calculating a virtual differential rotation speed in the above-described manner based on the virtual engine rotation speed calculated by the virtual-engine-rotation-speed calculator 186c and a rotation speed of the front wheels 114, serving as driving wheels, detected by the detector 186b. The virtual-differential-rotation-speed calculator 186d of the controller 180 of the electric vehicle 100 stores the calculated virtual differential rotation speed in the storage unit 186h.

In step S104-5, the virtual-synchronous-reaction-force calculator 186e of the controller 180 of the electric vehicle 100 refers to the virtual-synchronous-reaction-force map and executes a virtual-synchronous-reaction-force calculation process for calculating a virtual synchronous reaction force in the above-described manner based on the virtual differential rotation speed calculated by the virtual-differential-rotation-speed calculator 186d. The virtual-synchronous-reaction-force calculator 186e of the controller 180 of the electric vehicle 100 stores the calculated virtual synchronous reaction force in the storage unit 186h.

In step S104-7, the controller 180 of the electric vehicle 100 determines whether an operation is performed on the pseudo shift lever 160 by the driver. As a result, if an operation performed on the pseudo shift lever 160 by the driver is detected (YES in step S104-7), the controller 180 proceeds to step S104-9. If an operation performed on the pseudo shift lever 160 by the driver is not detected (NO in step S104-7), the controller 180 ends the shift-reaction-force-related process.

For example, if the value of the shift operational force stored in step S100-7 described above is larger than zero, it may be determined that an operation performed on the pseudo shift lever 160 by the driver is detected. If the value of the shift operational force is zero, it may be determined that an operation performed on the pseudo shift lever 160 by the driver is not detected.

In step S104-9, the shift-reaction-force calculator 186f of the controller 180 of the electric vehicle 100 refers to the first-shift-reaction-force map and executes a first-shift-reaction-force calculation process for calculating a first shift reaction force based on the virtual synchronous reaction force and the operational force applied to the pseudo shift lever 160 by the driver. The shift-reaction-force calculator 186f of the controller 180 of the electric vehicle 100 stores the calculated value of the first shift reaction force in the storage unit 186h.

As mentioned above, by using the values detected by the detector 186b, namely, the operational amount of the accelerator pedal 130, the rotation speed of the drive shaft 112, the vehicle speed, the position of the pseudo shift lever 160, the operational force applied to the pseudo shift lever 160 by the driver, and the operational amount of the pseudo clutch pedal 150 or information indicating whether the pseudo clutch pedal 150 is operated, a first shift reaction force mimicking an actual shift reaction force in an MT vehicle can be calculated. In other words, the value of the first shift reaction force can be changed in accordance with the operational amount of the accelerator pedal 130, the rotation speed of the drive shaft 112, the vehicle speed, the position of the pseudo shift lever 160, the operational force applied to the pseudo shift lever 160 by the driver, and the operational amount of the pseudo clutch pedal 150 or the information indicating whether the pseudo clutch pedal 150 is operated. Accordingly, this enables enhanced reproducibility when a manual gear changing operation of an MT vehicle is to be reproduced in a pseudo manner.

In step S104-11, the shift-reaction-force calculator 186f of the controller 180 of the electric vehicle 100 refers to the second-shift-reaction-force map and executes a second-shift-reaction-force calculation process for calculating a second shift reaction force based on the position (i.e., the shift position) of the pseudo shift lever 160. The shift-reaction-force calculator 186f of the controller 180 of the electric vehicle 100 stores the calculated value of the second shift reaction force in the storage unit 186h.

As mentioned above, by using the position of the pseudo shift lever 160 detected by the detector 186b, a second shift reaction force mimicking an actual shift reaction force in an MT vehicle can be calculated. In other words, the value of the second shift reaction force can be changed in accordance with the position of the pseudo shift lever 160. Accordingly, this enables enhanced reproducibility when a manual gear changing operation of an MT vehicle is to be reproduced in a pseudo manner.

In step S104-13, the shift-reaction-force calculator 186f of the controller 180 of the electric vehicle 100 executes a total-shift-reaction-force calculation process for calculating a total-shift-reaction-force value based on the value of the first shift reaction force stored in the storage unit 186h in step S104-9 described above and the value of the second shift reaction force stored in the storage unit 186h in step S104-11 described above. The shift-reaction-force calculator 186f of the controller 180 of the electric vehicle 100 stores the calculated total-shift-reaction-force value in the storage unit 186h.

In one example, the shift-reaction-force calculator 186f can calculate the total-shift-reaction-force value by adding the value of the first shift reaction force and the value of the second shift reaction force together. Alternatively, the shift-reaction-force calculator 186f may calculate the total-shift-reaction-force value by multiplying one or more of the value of the first shift reaction force and the value of the second shift reaction force by the predetermined weighting coefficient set in advance.

The shift-reaction-force controller 186g of the controller 180 of the electric vehicle 100 executes a shift-reaction-force-device control process in step S104-15 for causing the shift reaction force device to generate a shift reaction force based on the total-shift-reaction-force value stored in step S104-13 described above, and ends the shift-reaction-force-related process.

As described above, the electric vehicle 100 according to the embodiment including the motor 102 as a driving source includes an accelerator (accelerator pedal 130) configured to receive an acceleration request; a pseudo shifter (pseudo shift lever 160) configured to be operated by a driver who drives the electric vehicle and mimic a gear changing operation; a pseudo clutch (pseudo clutch pedal 150) configured to be operated by the driver and mimic a clutch operation; a detector (detector 186b) configured to detect an operation mode performed on each of the accelerator, the pseudo shifter, and the pseudo clutch by the driver, and to detect a rotation speed of a driving wheel (front wheels 114); a reaction force generator 170 configured to generate a reaction force in the pseudo shifter (pseudo shift lever 160) in response to an operation performed on the pseudo shifter (pseudo shift lever 160) by the driver; and a controller 180 configured to determine the reaction force to be generated in the pseudo shifter (pseudo shift lever 160). The controller 180 includes at least one processor 182 and at least one memory 184 coupled to the processor. The processor 182 is configured to: calculate a virtual differential rotation speed based on one or more of detection results obtained by the detector (detector 186*b*), the virtual differential rotation speed being based on at least a virtual engine rotation speed and the rotation speed of the driving wheel, the virtual engine rotation speed mimicking an engine rotation speed when the driving source is assumed as being an engine; and determine the reaction force (pseudo clutch pedal 150) to be generated in the pseudo shifter (pseudo shift lever 160) based on at least the virtual differential rotation speed.

Accordingly, this enables enhanced reproducibility when a manual gear changing operation of an MT vehicle is to be reproduced in a pseudo manner.

The detector (detector 186*b*) is capable of detecting an amount by which the pseudo clutch (pseudo clutch pedal 150) is operated by the driver. When determining the reaction force to be generated in the pseudo shifter (pseudo shift lever 160), the processor 182 is capable of changing the reaction force in accordance with a change in the amount by which the pseudo clutch (pseudo clutch pedal 150) is operated by the driver.

Accordingly, this further enables enhanced reproducibility when a manual gear changing operation of an MT vehicle is to be reproduced in a pseudo manner.

Although the embodiment of the disclosure has been described above with reference to the appended drawings, the embodiment of the disclosure is not to be limited thereto. It is apparent to a skilled person that various modifications and alterations are conceivable within the scope defined in the claims, and it is to be understood that such modifications and alterations naturally belong to the technical scope of the embodiment of the disclosure.

The series of processing performed by the electric vehicle 100 according to the above embodiment may be implemented by using software, hardware, or a combination of software and hardware. A program that implements the software is preliminarily stored in, for example, a non-transitory storage medium provided inside or outside each device. For example, the program is read from a non-transitory storage medium (e.g., a ROM) to a transitory storage medium (e.g., a RAM), and is executed by a processor, such as a CPU.

According to the above embodiment, a program for executing the process of each function of the electric vehicle 100 can be provided. Moreover, a non-transitory computer readable storage medium storing the program can also be provided. Examples of the non-transitory storage medium include a disk storage medium, such as an optical disk, a magnetic disk, or a magneto-optical disk, and a semiconductor memory, such as a flash memory or a universal serial bus (USB) memory.

The controller 180 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 180 including the processor 182 and the memory 184. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An electric vehicle comprising a motor as a driving source, the electric vehicle comprising:
   an accelerator configured to receive an acceleration request;
   a pseudo shifter configured to be operated by a driver who drives the electric vehicle, and mimic a gear changing operation;
   a pseudo clutch configured to be operated by the driver and mimic a clutch operation;
   a detector configured to detect an operation mode performed on the accelerator by the driver, an operation mode performed on the pseudo shifter by the driver, an operation mode performed on the pseudo clutch by the driver, and a rotation speed of a driving wheel;
   a reaction force generator configured to generate a reaction force in the pseudo shifter in response to the operation mode performed on the pseudo shifter by the driver; and
   a controller configured to determine the reaction force to be generated in the pseudo shifter,
   wherein the controller comprises:
   at least one processor; and
   at least one memory coupled to the at least one processor, and
   wherein the at least one processor is configured to:
   calculate a virtual differential rotation speed based on one or more of detection results obtained by the detector, the virtual differential rotation speed being based on at least a virtual engine rotation speed and the rotation speed of the driving wheel, the virtual engine rotation speed mimicking an engine rotation speed when the driving source is assumed as being an engine, and
   determine the reaction force to be generated in the pseudo shifter based on at least the virtual differential rotation speed.

2. The electric vehicle according to claim 1,
   wherein the detector is configured to detect an amount by which the pseudo clutch is operated by the driver, and
   wherein the at least one processor is configured to, upon determining the reaction force to be generated in the pseudo shifter, change the reaction force in accordance with a change in the amount by which the pseudo clutch is operated by the driver.

3. An electric vehicle comprising a motor as a driving source, the electric vehicle comprising:
   an accelerator pedal configured to receive an acceleration request;
   a pseudo shift lever configured to be operated by a driver who drives the electric vehicle and mimic a gear changing operation;
   a pseudo clutch pedal configured to be operated by the driver and mimic a clutch operation;
   a reaction force generator including an actuator configured to be driven in response to an operation performed on the pseudo shift lever by the driver, the reaction force generator being configured to generate a reaction force in the pseudo shift lever in response to the operation performed on the pseudo shift lever by the driver; and
   circuitry configured to:
   detect an operation mode performed on the accelerator pedal by the driver, an operation mode performed on the pseudo shift lever by the driver, an operation mode performed on the pseudo clutch pedal by the driver, a rotation speed of a driving wheel, determine the reaction force to be generated in the pseudo shift lever, wherein the circuitry is configured to:

calculate a virtual differential rotation speed based on one or more of results of detecting the operation mode performed on the accelerator pedal by the driver, the operation mode performed on the pseudo shift lever by the driver, the operation mode performed on the pseudo clutch pedal by the driver, and the rotation speed of the driving wheel, the virtual differential rotation speed being based on at least a virtual engine rotation speed and the rotation speed of the driving wheel, the virtual engine rotation speed mimicking an engine rotation speed when the driving source is assumed as being an engine, and determine the reaction force to be generated in the pseudo shift lever based on at least the virtual differential rotation speed.

* * * * *